United States Patent
Kawai et al.

[11] Patent Number: 5,861,547
[45] Date of Patent: Jan. 19, 1999

[54] APPARATUS FOR AND METHOD OF TESTING LEAKAGE OF HOLLOW MEMBER

[75] Inventors: Shigeya Kawai, Sagamihara; Tsuyoshi Yoshioka, Hachioji, both of Japan

[73] Assignee: Daiwa Can Company, Tokyo, Japan

[21] Appl. No.: 909,876

[22] Filed: Aug. 12, 1997

[30] Foreign Application Priority Data

Aug. 13, 1996 [JP] Japan ................................. 8-231369
Jun. 27, 1997 [JP] Japan ................................. 9-187705

[51] Int. Cl.⁶ .................................................. G01M 3/00
[52] U.S. Cl. ................................................ 73/49.2; 73/40.7
[58] Field of Search ...................... 73/49.2, 40.7, 73/46

[56] References Cited

U.S. PATENT DOCUMENTS

| | | | |
|---|---|---|---|
| 3,423,990 | 1/1969 | Martin | 73/49.2 X |
| 3,762,212 | 10/1973 | Morley et al. | 73/49.2 X |
| 3,949,596 | 4/1976 | Hawk | 73/40.7 |

FOREIGN PATENT DOCUMENTS

| | | | |
|---|---|---|---|
| 54-59191 | 5/1979 | Japan | 73/40.7 |
| 56-51634 | 5/1981 | Japan | 73/40.7 |
| 58-44325 | 3/1983 | Japan | 73/49.2 |
| 60-178332 | 9/1985 | Japan | 73/40.7 |
| 6-56744 | 8/1994 | Japan . | |
| 6-48373 | 12/1994 | Japan . | |
| 64-1486823 | 6/1989 | U.S.S.R. | 73/49.2 |
| 47-1273379 | 5/1972 | United Kingdom | 73/40.7 |

*Primary Examiner*—Daniel S. Larkin
*Attorney, Agent, or Firm*—Oblon, Spivak, McClelland, Maier & Neustadt, P.C.

[57] ABSTRACT

A leakage testing apparatus for testing whether or not a hollow member of a hollow shape has a leakage, comprising: a hold mechanism for holding the hollow member such that the inside and the outside are isolated gas-tight from each other; an injection mechanism for injecting a testing gas into the hollow member held by the hold mechanism; and a leakage detector for sucking the gas around the hollow member held by the hold mechanism, to detect the leakage on the basis of the concentration of the testing gas in the sucked gas.

13 Claims, 10 Drawing Sheets

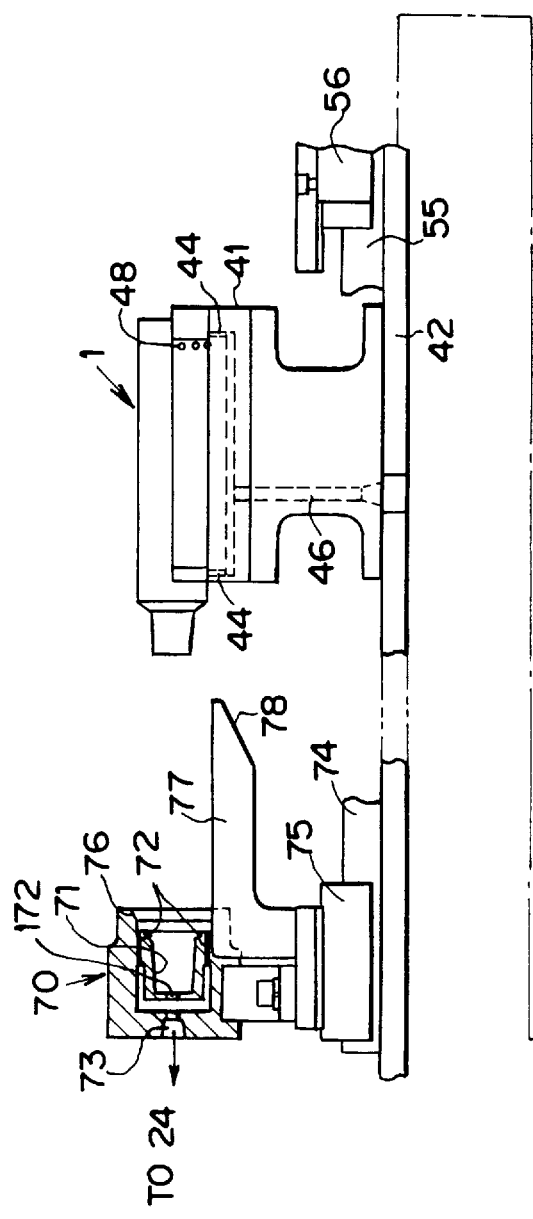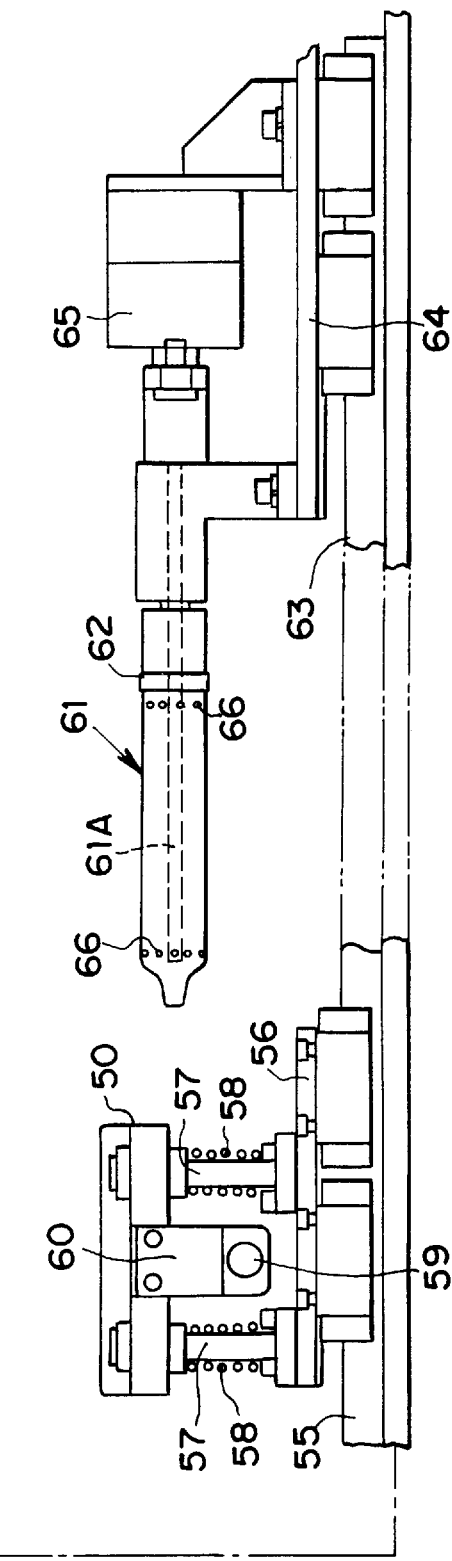
FIG.7

APPARATUS FOR AND METHOD OF TESTING LEAKAGE OF HOLLOW MEMBER

BACKGROUND OF THE INVENTION

1. Field of the Invention

The present invention relates to an apparatus for and a method of testing whether or not a hollow member of a hollow shape such as a laminated tube, a can, or a can lid has a leakage.

2. Related Art

A member such as the laminated tube or the can may be formed by jointing its parts. The member may also be formed by jointing a plurality of members such as a body and a head piece, or a can body and a can lid. When these members are used as containers, they are required to have a sealing property. It is, therefore, necessary to test whether or not a leakage portion is due to an insufficient joint or due to a defect in the materials, before the containers are filled with their contents. An apparatus for this test is disclosed in JU-A-6-56744 (or JU-B-6-48373).

The apparatus, as disclosed in the Publication, tests the leakage of a gas in a container such as a can. This apparatus is constructed to test the leakage of a container of a sealed structure, by pressuring and injecting a testing gas into the inside of the container, by arranging a gas detecting sensor around the container, and by rotating the container and the gas detecting sensor relative to each other to detect the testing gas leaking to the outer circumference of the container.

However, the above-mentioned apparatus detects the leakage by detecting the gas, as pressurized and injected into the inside of the container, by the gas detecting sensor. Therefore, the gas to be employed cannot but be a gas which is not present in the ambient atmosphere. In short, the apparatus of the prior art has to employ a special gas. Prior to the test, moreover, the gas has to be completely excluded from the atmosphere. For an accurate test without being influenced by the residual gas, therefore, the control process for automation may probably be complicated.

On the other hand, the apparatus of the prior art is constructed such that the testing gas, as pressurized and injected into the container, is blown out from the container and guided into the gas detecting sensor thereby to decide the leakage from the container. When the leakage is restricted or when the testing gas diffuses along the wall face of the container, therefore, it is difficult to capture the testing gas and to guide it into the gas detecting sensor. Thus, it has been difficult to let the prior apparatus have a necessary and sufficient detecting accuracy of leakage.

Since the conventional apparatus detects the leakage by rotating the container, moreover, the spacing between the sensor and the container body is not constant, when the container itself does not have a cylindrical shape, so that the container partially leaves the sensor to make it impossible to detect the leakage at the spaced portion.

On the other hand, the leaking portion or the defect of the container may be a fine pore or a hole, as formed along the face due to the insufficient joint, and the gas flow emanating from such leaking portion will not always be injected outward normal to the container face. However, the conventional apparatus is not equipped with means for guiding the gas positively to the sensor and may fail to detect the gas which leaks from the fine pore or the facial hole so that it is deficient in the accuracy of detecting the leakage. Especially since the conventional apparatus is constructed to rotate the container and the sensor relatively, even with a guard member for guiding the gas near the outer circumference of the container into the detector, a small quantity of gas which leaked from the pore or the hole may flow along the circumferential wall face of the container and may not be accurately detected. These disadvantages become the more serious for the higher relative rotating speeds of the container and the sensor. After all, it is difficult to speed up the leakage test of the container.

SUMMARY OF THE INVENTION

An object of the present invention is to provide an apparatus and a method capable of testing highly accurately whether or not a hollow member such as a container or its parts has a leakage.

According to the present invention, there is provided a leakage testing apparatus for testing whether or not a hollow member of a hollow shape has a leakage, comprising; a hold mechanism for holding the hollow member such that the inside and the outside are gas-tight isolated from each other; an injection mechanism for injecting a testing gas into the hollow member held by the hold mechanism; and leakage detecting means for sucking the gas around the hollow member held by the hold mechanism, to detect the leakage on the basis of the concentration of the testing gas in the sucked gas.

According to this apparatus, therefore, the hollow member to be tested is held at first in the state in which its inside and outside are isolated gas-tight, and then the gas in the outer circumference of the hollow member is sucked by the leakage detecting means. Similarly, when the testing gas is injected into the inside of the hollow member, the gas in the outer circumference of the hollow member is sucked by the leakage detecting means. When the testing gas is not injected into the inside of the hollow member and when the hollow member has no leaking portion, the atmosphere is exclusively sucked by the leakage detecting means. If the hollow member has a leaking portion, on the other hand, the testing gas is mixed into the ambient gas around the hollow member and is sucked by the leakage detecting means. If the hollow member has any leaking portion, therefore, the detected concentration of the testing gas is higher than that immediately before the start of the test so that the presence of the leaking portion in the hollow member is detected in terms of the rise in the testing gas concentration. In short, the apparatus of the present invention is simple in operations because it sucks the ambient gas around the entirety of the outer circumference of the hollow member and detects the concentration of the testing gas in the sucked gas. Moreover, the apparatus can detect the presence of the leaking portion in the hollow member promptly and accurately because it can capture the testing gas which leaked from the hollow member, without fail.

According to the present invention, moreover, there is provided a method of detecting whether or not a hollow member has a gas leakage, comprising: setting the measured value of the concentration of a testing gas, as contained in an ambient gas of the hollow member, as a reference value; injecting the testing gas into the inside of the hollow member; sucking and collecting the ambient gas around the hollow member; measuring the concentration of the testing gas in the sucked and collected ambient gas; and deciding whether or not the leakage from the hollow member is, by comparing the measured value and the reference value.

According to the method of the present invention, therefore, the concentration of the testing gas in the ambient gas when the testing gas is not fed and the concentration of the testing gas in the ambient gas when the testing gas is fed to the inside of the hollow member are compared so that the leakage from the hollow member can be decided when the testing gas concentration is relatively high. This makes it possible to perform the so-called "open type leakage test" with reference to the ambient gas.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 7 is a schematic diagram showing an apparatus, as constructed to test the leakage of the entirety of the hollow body, according to another embodiment of the present invention;

DETAILED DESCRIPTION OF THE PREFERRED EMBODIMENTS

Figure 6:
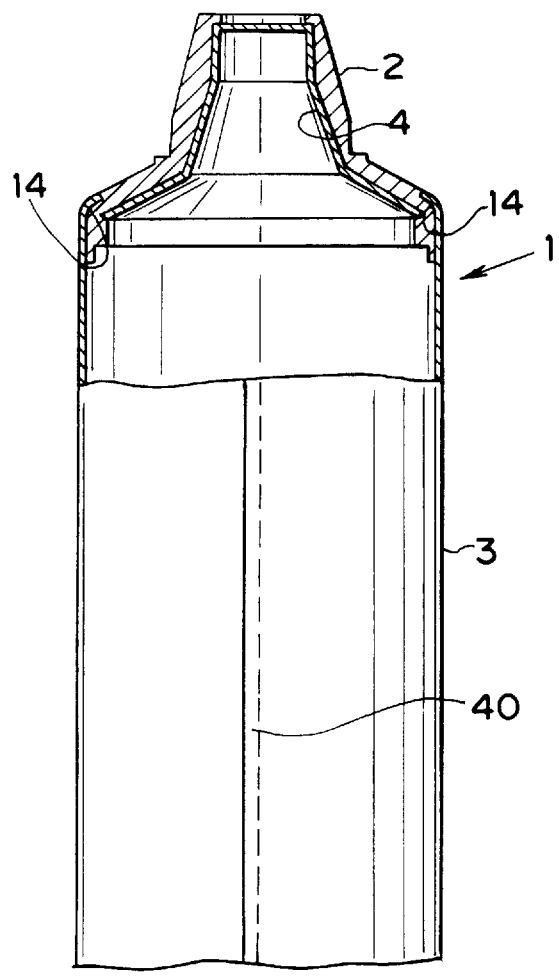
FIG. 6 is a partially broken front elevation schematically showing one example of the hollow body to be tested.

The present invention will be described more specifically. A hollow body to be tested in the present invention is exemplified by a hollow body (or member) 1 for the laminated tube which can be used for low-acidic fluid food and retorted for a long-term storage. As shown in FIG. 6, this hollow body 1 is a flexible container which is composed by a head piece 2 and a cylindrical body member 3 fixed gas-tight each other by suitable means such as by welding or jointing them. Moreover, the head piece 2 of the hollow member 1 is covered on its inner face with a metal foil (e.g., resin-coated aluminum foil) and is sealed at its leading end opening with the metal foil 4.

Here, the body member 3 of the hollow body 1 is generally formed of the material which has a metal (e.g., aluminum foil) sandwiched between the inner and outer layers of polypropylene (PP).

One embodiment of a leakage testing apparatus 5 according to the present invention will be described with reference to FIGS. 1 and 2. Of these, FIG. 1 is a schematic diagram showing the entirety of the leakage testing apparatus 5, and FIG. 2 is an enlarged section of a portion of the leakage testing apparatus 5 and shows the state in which the hollow body 1 to be tested is fitted in a head cover 17 of the leakage testing apparatus 5.

Figure 1:
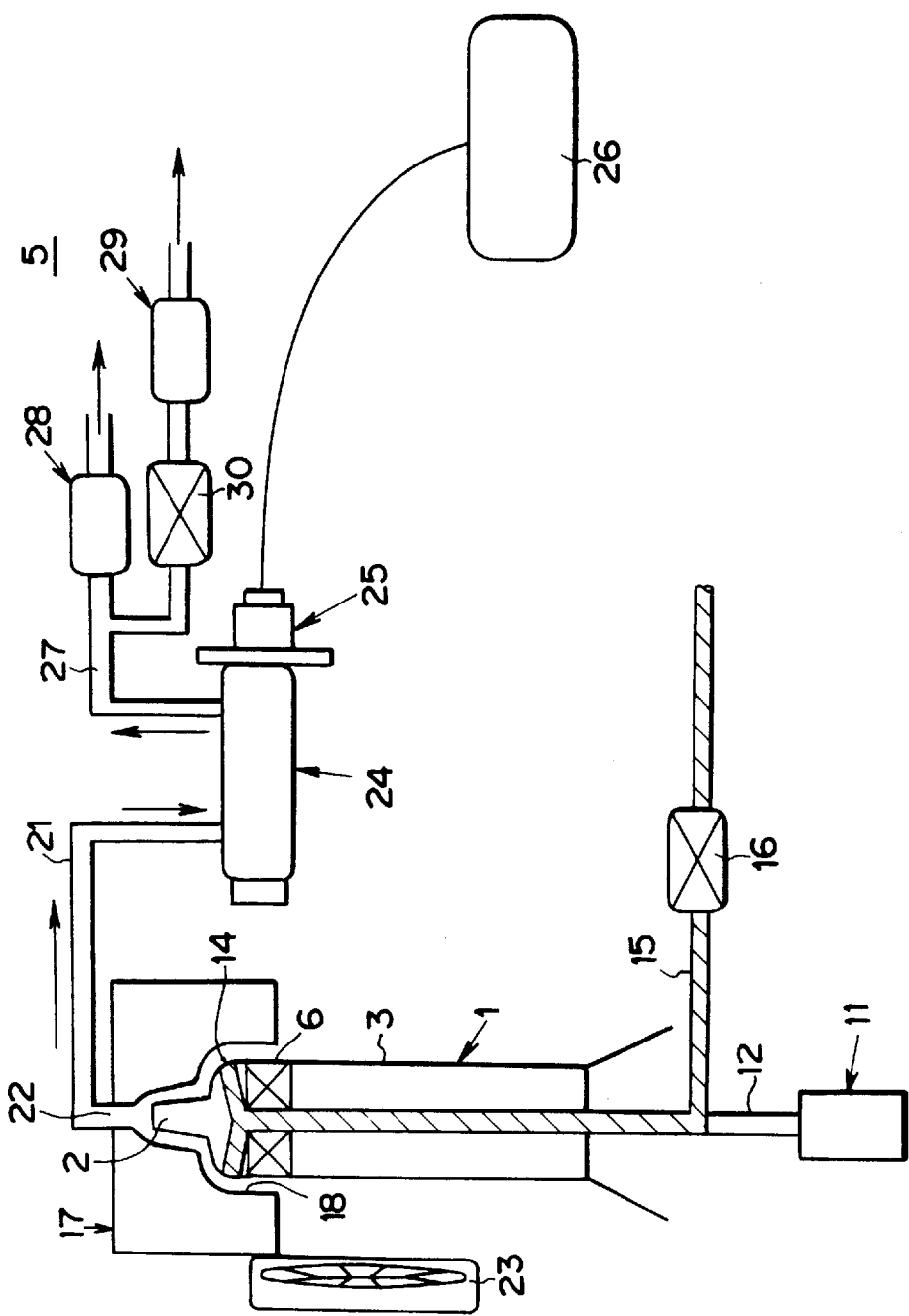
FIG. 1 is a schematic diagram showing the entirety of a leakage testing apparatus according to an embodiment of the present invention.
Figure 2:
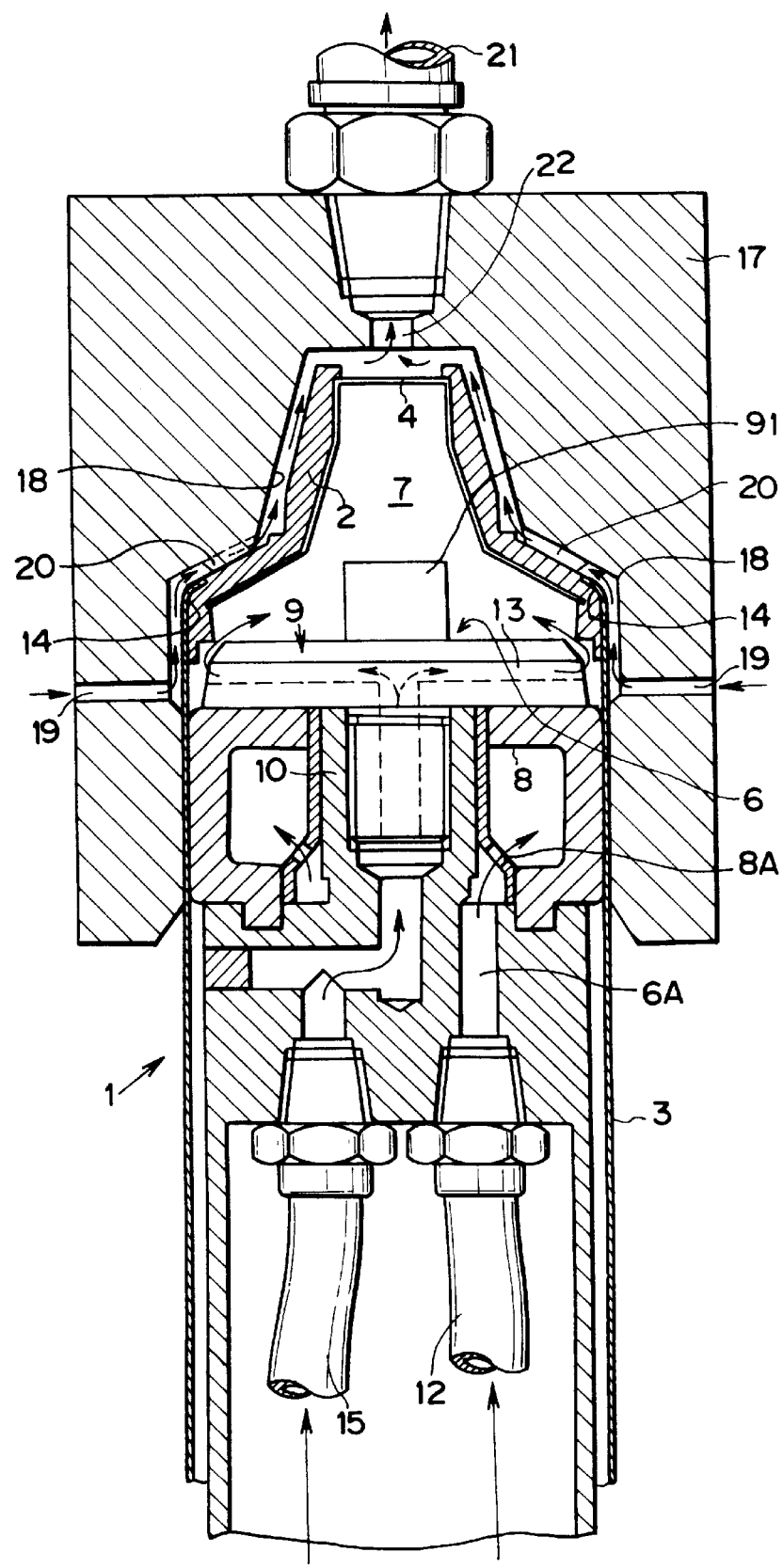
FIG. 2 is an enlarged section showing a hollow body fitting portion of the apparatus.

As shown in FIGS. 1 and 2, the apparatus 5 is equipped with an injection nozzle head 6 which is inserted into and supports the hollow body 1 from the inside. This injection nozzle head 6 forms a part of a retaining mechanism of the present invention and is exemplified by a generally cylindrical member having a smaller external diameter than the internal diameter of the body portion of the hollow body 1. The injection nozzle head 6 is equipped with a chuck 8 for defining a sealed space 7, when brought into contact with the inner circumference of the body member 3, in the hollow body 1 at the side of the head piece 2. At a portion closer to the leading end side of the injection nozzle head 6 than the chuck 8, moreover, there is mounted integrally with the chuck 8 a top piece 9 for injecting the testing gas into the sealed space 7.

At the leading end side of the injection nozzle head 6, more specifically, there is formed a neck portion 10 which is projected on the center axis to fit the annular chuck 8 on its outer circumference. This chuck 8 is made of an elastic material such as rubber so that it is radially expanded when fed therein with pressurized air. On the leading end of the neck portion 10, moreover, there is screwed the top piece 9 to fix the chuck 8 with respect to the injection nozzle head 6.

As shown in FIG. 2, moreover, the chuck 8 is opened at 8A in its inner circumference fitting the neck portion 10. On the other hand, an air passage 6A, as opened in the outer circumference of the root portion of the neck portion 10, is formed through the body portion of the injection nozzle head 6. To this air passage 6A, there is connected a chuck fastening air feeder 11 through an air feeding pipe 12.

This chuck fastening air feeder 11 is composed mainly of a pressurized air source such as a compressor and a valve for controlling the feed/discharge of the pressurized air and is electrically controlled to feed the pressurized air to the injection nozzle head 6 thereby to expand the chuck 8 radially.

On the other hand, the top piece 9 has a disc-shaped portion having a diameter substantially equal to the external diameter of the injection nozzle head 6, and testing gas feed passages 13 are radially formed in the disc-shaped portion. Specifically, the feed passages 13 are so formed as to blow the testing gas radially of the hollow body 1 so that the metal foil 4, as adhered to the inner face of the head piece 2, may be exposed neither directly to the dynamic pressure of the testing gas nor broken by the gas. In FIG. 2, a cylindrical portion 91, as located at the central portion of the leading end of the injection nozzle head 6, is a projection for minimizing the capacity of the sealed space 7. As the capacity of sealed space 7 is smaller, the time period, as required for the sealed space 7 to be filled up with the testing gas, can be made shorter, thereby raising the testing speed.

In the shown embodiment, the testing gas feed passage 13 is directed, when the injection nozzle head 6 is inserted into the hollow body 1, toward a weld (or a joint) body 14 between the head piece 2 and the shoulder of the body member 3 so that it can blow the testing gas to the weld (or the joint) 14. This is because the shown embodiment is constructed mainly to test the leakage at the weld 14. In the present invention, the portion to be tested of its leakage should not be limited to the shoulder. In short, it is sufficient that the blow position of the testing gas is located in the hollow body.

A pipe 15 for feeding the testing gas is connected through the central portion of the neck portion 10 to the top piece 9. This pipe 15 is made to communicate through a solenoid valve 16 with the testing gas source such as a gas cylinder (not shown) so that the feed of the testing gas to the inside of the sealed space 7 of the hollow body 1 is controlled by the solenoid valve 16. In order to enhance the testing accuracy, moreover, it is preferable to feed the testing gas to the sealed space 7 after the initial gas residing in the sealed space 7 is discharged immediately before the injection of the testing gas. It is preferable, for example, to evacuate the sealed space 7. For this evacuation, a pipe communicating with a vacuum source (not-shown) is connected to the solenoid valve 16 to discharge the residual gas from the inside of the sealed space 7 through the pipe 15.

Here, the leakage testing gas frequently used is helium gas, which is expensive. As an inexpensive gas, there is enumerated nitrogen gas which is prevalent in the atmosphere. This makes it difficult to decide whether or not the nitrogen gas, even if detected, comes from the leakage, and the detection accuracy may fall. In the present invention, therefore, the testing gas is preferably exemplified by carbon dioxide gas. The reason why carbon dioxide is adopted is not only because it is inexpensive, but also, because its content in the atmosphere is low. Specifically, the carbon dioxide concentration in the sampled gas is abnormally raised (or highly changed) even if its leakage is small, so that the decision of the presence/absence of leakage, i.e., the detection of leakage can be facilitated to enhance the detection accuracy. This test could be made by using the nitrogen gas, the helium gas, and other gases.

As shown in FIG. 2, moreover, the head cover 17 for receiving the leading end portion of the hollow body 1 including the head piece 2 is arranged at the leading end side of the injection nozzle head 6. This head cover 17 is a member having a hollow portion (or recess) 18 which is shaped to have a contour generally identical to that of the leading end portion of the hollow body 1. In the head cover 17, there are formed inlet holes 19 for introducing the atmosphere into the hollow portion 18. In the portions confronting the outer circumference of the body member 3 with the leading end portion of the hollow body 1 being inserted into the hollow portion 18, there are radially formed equidistantly all over the circumference the plurality of inlet holes 19 which are extended radially inward through the head cover 17. The inlet holes 19 are so determined in number and diameter that they can suck the atmosphere in an amount corresponding to the suction of a pump 28 (29) and uniformly from the whole circumference. As a result, the hollow portion 18 in the head cover 17 is kept open to the atmosphere at all times.

In the hollow portion 18, on the other hand, there are radially formed a plurality of ribs 20 which are positioned to confront the shoulder portion of the head piece 2. These ribs 20 regulate the leading end portion of the hollow body 1 by abutting against the shoulder portion of the head piece 2 other than the weld 14. Moreover, the ribs 20 are spaced from one another so that they may not check the flow of gas.

In the deepest portion of the hollow portion 18 of the head cover 17, i.e., in the portion to confront the leading end portion of the head piece 2, moreover, there is formed a suction hole 22, to which is connected a later-described suction pipe 21. This suction hole 22 is formed to suck the ambient gas residing around the hollow body 1, as inserted into the hollow portion 18 of the head cover 17. Therefore, the suction hole 22 and the inlet holes 19 are arranged at the opposite sides in the longitudinal direction of the hollow body 1.

In the vicinity of the portion of the head cover 17 for receiving the hollow body 1, as shown in FIG. 1, there is arranged an ambient gas blowing fan 23. This fan 23 is provided for preventing the gas used for the leakage test from residing in the vicinity of the portion for receiving the hollow body 1. The concentration of the testing gas in the ambient gas in the portion for receiving the hollow body 1 is substantially homogeneously kept at all times by the flowing action of the fan 23.

To the suction hole 22 of the head cover 17, as has been described hereinbefore, there is connected the suction pipe 21 which in turn is connected to a gas testing conduit 24. The gas testing conduit 24 is equipped at its one end with such means for measuring the testing gas concentration in the sucked gas as is exemplified by a nondispersive infrared detector 25 for receiving an infrared ray emitted from the other end portion (as located at the left end portion of the conduit 24 of FIG. 1). Specifically, the conduit 24 is constructed as a chamber for diffusing the sucked gas while lowering its flow rate and for causing the infrared detector 25 to receive the infrared ray. This infrared detector 25 detects the testing gas concentration by electrically picking up the adsorption of the infrared ray by the gas in the conduit 24. Specifically, the infrared ray is emitted into the conduit 24, the change in the absorption of the infrared ray, i.e., the change in the electric signal according to the rise in the concentration of the testing gas ($CO_2$) in the conduit 24 is detected by the infrared sensor in the detector 25 so that the concentration of the testing gas is outputted as a signal.

The infrared detector 25 is connected with a controller 26 which is composed mainly of a microcomputer. Specifically, the detected signal of the infrared detector 25 is outputted to the controller 26 so that data, as based on the signal, are recorded in the controller 26. This controller 26 converts the data and decides whether or not a set reference value is exceeded by the converted value so that the signal of the decision result can be outputted to the outside. If desired, the decision signal activate means for excluding the hollow body having a leaking portion, from the conveyor for the hollow bodies 1 having no leaking portion.

To the conduit 24, there is connected a discharge pipe 27 for guiding the gas to the outside. This discharge pipe 27 is branched in its mid-section, for example, to have branches connected to a suction pump 28 for the testing gas and a purge pump 29. In the branch leading to the purge pump 29, there is disposed a purge solenoid valve 30, which is opened/closed to open/stop the communication between the conduit 24 and the purge pump 29.

Here will be described the action of the leakage testing apparatus 5 of the embodiment, i.e., the leakage testing method of the present invention.

In the leakage testing method of the invention, the ambient gas around the testing apparatus is sucked into the gas testing conduit 24 so that the concentration of the testing gas is measured, and a zero point is set with reference to the measured value. After this, the injection nozzle head 6 is inserted from the open end portion into the hollow body 1 to be tested, and this hollow body 1 itself is inserted into the hollow portion 18 of the head cover 17. When the pressurized air is fed to the inside of the chuck 8 from the air feeder 11, the chuck 8 of the elastic structure is radially expanded. The chuck 8 thus expanded comes into contact with the inner circumference of the body wall portion, i.e., the body member 3 of the hollow body 1 to establish the sealed space 7 at the leading end side of the hollow body 1.

When the solenoid valve 16 is opened in this state, the testing gas (e.g., $CO_2$ gas) is fed to the top piece 9 and then to the inside of the sealed space 7. Simultaneously with this, a suction is made from the suction hole 22, as formed in the upper portion of the head cover 17. Then, the atmosphere is sucked from the inlet holes 19 into the hollow portion 18, and the atmosphere, as having flown new the outer circumference of the leading end portion of the hollow body 1 inserted into the head cover 17, is sucked into the suction hole 22. The gas thus sucked is guided into the gas testing conduit 24, in which the concentration of the testing gas is measured by the infrared detector 25. This measured value is compared with the testing gas concentration at the set zero level so that the leakage from the hollow body 1 is decided on the basis of the comparison result.

Figure 4:
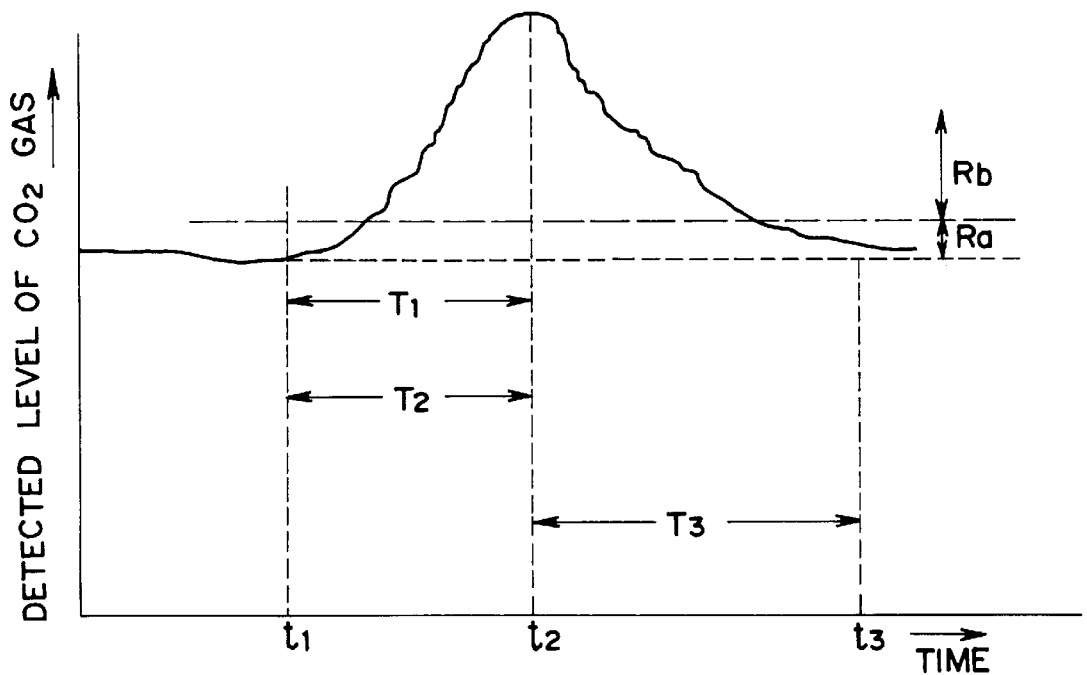
FIG. 4 is a time chart illustrating one example of the detected waveform of a leakage gas when the weld is partially defective.
Figure 5:
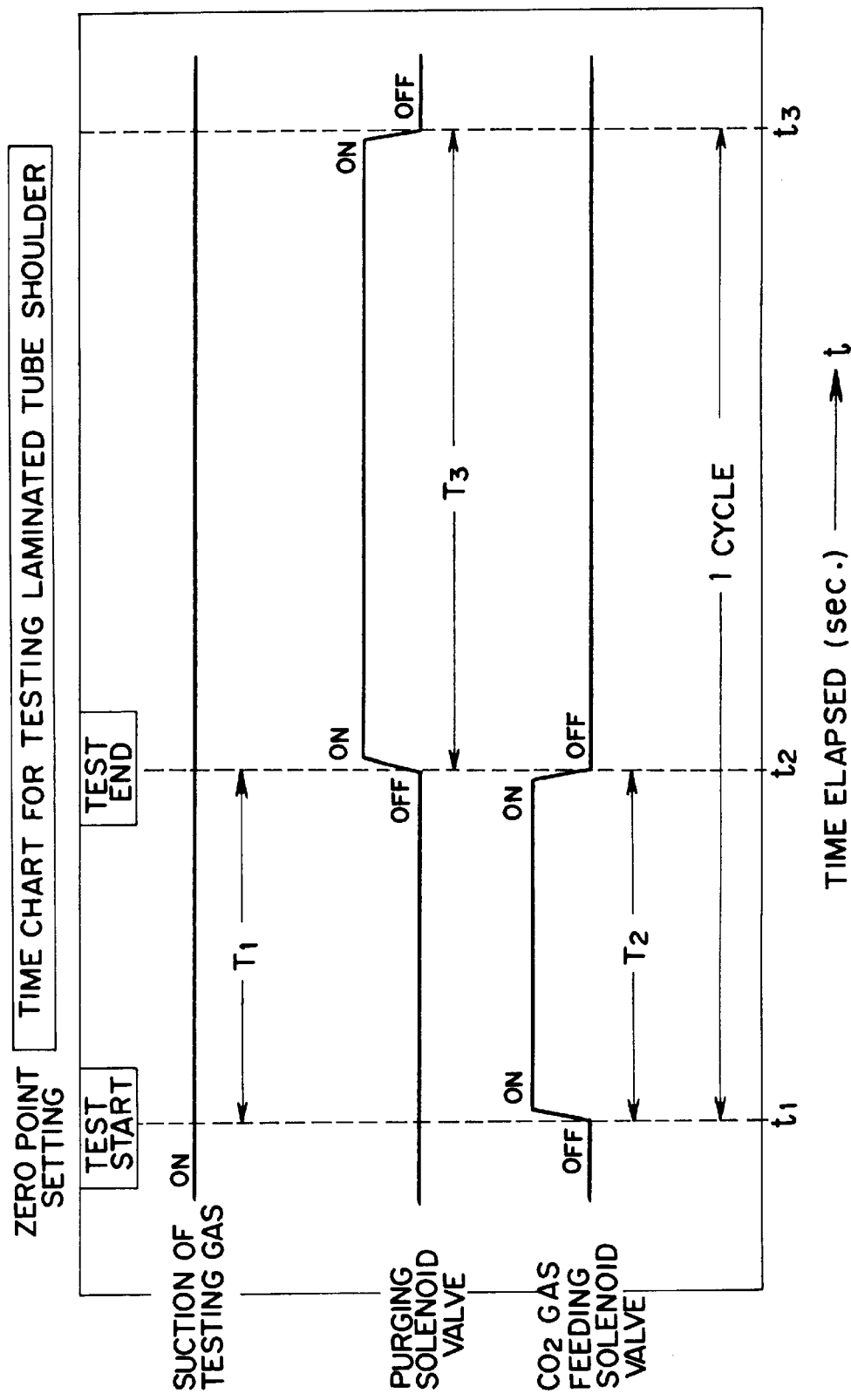
FIG. 5 is also a time chart illustrating the testing steps of the testing apparatus of the embodiment of the present invention.

This testing process will be described in more detail. First of all, the zero point is set, as illustrated in the time chart of FIG. 5. Specifically, the testing gas suction pump 28 and the purge pump 29 are activated at all times so that the ambient gas, i.e., the atmosphere in the head cover 17 is sucked before the insertion of the hollow body 1 into the head cover 17, to purge the air passage from the head cover 17 to the testing conduit 24. In this case, the suction is made by both the purge pump 29 and the suction pump 28 so that the air passage is purged for a short time period, i.e., T3 (e.g., about 0.5 sec.), as indicated in FIGS. 4 and 5.

After this, the purge solenoid valve 30 is closed so that the ambient gas in the head cover 17 is sucked exclusively by the suction pump 28 into the chamber, i.e., the conduit 24 being irradiated with the infrared ray. In this state, the ambient gas before the test, i.e., the atmosphere in the test circumstance is flowing as it is into the conduit 24 so that the detected value to be outputted from the infrared detector 25, i.e., the ratio of absorption of the infrared ray by the atmosphere is adopted as the reference valve or the zero point. This occurs at time t1 of FIGS. 4 and 5, and the concentration of the carbon dioxide in the atmosphere is set to the zero point.

After this zero point setting, the substantial test is started. Before the aforementioned purge and the subsequent start of the testing gas feed, the injection nozzle head 6 is inserted by a predetermined stroke from the open end portion into the inside of the hollow body 1. Specifically, the injection nozzle head 6 is inserted so far as the position in which the atmosphere inlet passages 19 formed in the head cover 17 are not clogged by the expanded chuck 8 of the injection nozzle head 6 and in which the opening of the testing gas feed passage 13 of the top piece 9 comes close to the weld 14 between the head piece 2 and the body member 3.

Then, the hollow body 1 is moved forward together with the injection nozzle head 6, and its closed side end portion is inserted and set in position in the head cover 17. In this case, more specifically, the hollow body 1 is inserted so far that the portion of its shoulder, as located more radially central than the weld 14, abuts against the radial ribs 20 formed in the head cover 17. In this case, moreover, no seal is established between the head cover 17 and the hollow body 1, but small clearances are left between the hollow body 1 and the inner face of the head cover 17.

Then, the chuck actuating air feeder 11 is activated to feed the pressurized air into the chuck 8, as located inside of the hollow body 1, to expand it radially. Specifically, the air feeder 11 feeds the pressurized air through the pipe 12 to the chuck 8 so that the chuck 8 is radially expanded to push the body member 3 radially outward. As a result, the outer circumference of the chuck 8 comes into close contact with the body member 3 to seal the leading end portion of the hollow body 1. Moreover, this hollow body 1 is fixed by the chuck 8 while forming the sealed space 7 at its leading end side.

In this state, the aforementioned zero point setting is made. Immediately after this, the solenoid valve 16 for feeding the testing gas is opened to feed the testing gas to the top piece 9 through the pipe 15. Then, the sealed space 7, as formed at the leading end side of the hollow body 1, is fed with the pressurized testing gas for a predetermined time period T2 (e.g., about 0.4 to 0.8 sec.), as indicated in FIGS. 4 and 5, through the testing gas feed passage 13 formed in the top piece 9, thereby to raise the internal pressure of the sealed space 7.

Here, the testing gas feeding pressure is preferably set to a level considering the internal pressure to be applied at the subsequent steps of filling the hollow body 1 with its content and retorting the content. Then, it is possible to detect even the container having such a defective welded or jointed portion at this testing step that the weld or joint might otherwise come out after the container has been filled with the content and sealed up.

In this case, moreover, the testing gas is blown in the direction of radius of the hollow body 1 from the testing gas feed passage 13 so that its dynamic pressure does not act directly upon the metal foil 4 or the seal portion at the leading end side of the head piece 2 of the hollow body 1. As a result, the metal foil 4 acting as the seal is not broken by the feed of the testing gas.

With the inside of the hollow body 1 having been fed with the testing gas and with the solenoid valve 30 communicating with the purge pump 29 being closed, moreover, the suction is made from the suction hole 22 formed in the head cover 17, by the testing gas suction pump 28. As a result, the inside, i.e., the hollow portion 18 of the head cover 17 is evacuated so that the ambient air is sucked from the inlet holes 19 to flow near the outer wall of the leading end portion of the hollow body 1, until it is fed together with the existing gas to the gas testing conduit 24 through the suction hole 22 and the suction pipe 21. In short, the testing gas is forced into the hollow body 1, and the ambient gas in the head cover 17 is fed to the conduit 24.

If the weld (or the joint) 14 of the hollow body 1 is defective to have a leakage of the testing gas, this testing gas is sucked together with the atmosphere. In other words, both the atmosphere and the testing gas having leaked are simultaneously sucked from the inside of the head cover 17.

In this case, moreover, the portion close to the center than the weld 14 is in abutment against the head cover 17, but is enabled to retain the gas passage by the ribs 20 so that it will not obstruct the gas flow.

The gas, as sucked through the suction pipe 21, is fed to the gas testing conduit 24 so that it is diffused in the conduit 24 to lose its flow velocity. Moreover, the infrared ray is emitted toward the gas thus diffused in the conduit 24 and reaches the infrared detector 25. The absorption of the infrared ray depending upon the concentration of the testing gas, as contained in the diffused gas, is electrically picked up so that the change in the electric signal according to the concentration change of the testing gas is detected.

While the ambient gas is being sucked for a predetermined testing time period T1 (e.g., about 0.8 sec.), as illustrated in FIGS. 4 and 5, either the value at the time when the testing gas concentration having leaked and contained in the ambient gas exceeds a dispersion region Ra at the atmospheric level and reaches a defective level region Rb to be detected, or the value at the time when the concentration of the testing gas having leaked after keeping the pressurization of the testing gas and the suction of the ambient gas for a constant time period reaches a peak is measured. The electric signal, as based on the measured value, is outputted from the infrared detector 25 to the controller 26.

In this case, the measured value of the testing gas concentration in the atmosphere has slight dispersion even in a indefective article, as illustrated in the dispersion region, i.e., the Ra region at the atmospheric level of FIG. 4. If the hollow body 1 is indefective, the atmosphere is exclusively sucked. If the leakage exists, however, the concentration of the testing gas in the sucked ambient gas rises. As a result, the detected value according to the concentration of the carbon dioxide gas reaches the defect deciding level, i.e., the Rb region, as illustrated in FIG. 4, so that a testing gas concentration over the dispersion of the indefective article. In short, the testing gas concentration over the dispersion region of the atmospheric level of FIG. 4 is detected so that the electric signal on the basis of the concentration is outputted from the infrared detector 25. The ratio of the testing gas, as contained in the gas, is detected on the basis of the electric signal by the controller 26 and is recorded as data in the controller 26.

In the controller 26, moreover, the data recorded at the leakage testing time and the data recorded as the reference value are compared to decide whether or not the concentration of the testing gas, as contained in the gas sucked at the testing time, is higher than the reference value. Specifically, the gas leakage is detected on the basis of the relative value of the concentration of the testing gas on the basis of the electric signal, as outputted after the purge from the infrared detector 25, that is, the concentration of the testing gas in the atmosphere for the reference value, and the concentration of the testing gas in the sucked gas. In short, no leakage is decided if the detected value belongs to the Ra region of FIG. 4, but a leakage is decided if the detected value belongs to the Rb region. The test is ended at a time t2, as indicated in FIGS. 4 and 5.

In other words, the controller 26 sets the concentration of a specific substance in theatmosphere at zero point and decides whether or not the article is defective, in dependence upon whether or not the concentration of the specific substance exceeds the Ra region of FIG. 4, i.e., the general concentration fluctuation range of the substance in the atmosphere. If the article is indefective, the detected value of the testing gas is kept within the fluctuation range in the dispersion (i.e., the Ra region) of the atmospheric level in FIG. 4. If the article is so defective as to have a leakage, on the other hand, the detected value of the testing gas reaches the defect deciding level (i.e., the Rb region) of FIG. 4.

In the testing process described above, the testing gas, as blown from the testing gas feed passage 13, is set to conform to the internal pressure or the like, as required of the hollow body 1, during the retorting operation. If the welding strength of the weld 14 is low, this weld 14 is broken by the pressure in the sealed space 7 so that the testing gas will leak to the outside. As a result, even the article having an incomplete weld can be detected as a defective one by this leakage test.

Specifically, the weld 14 at the shoulder portion of the hollow body 1 can be tested. When the hollow body 1 has such an insufficient welding strength that it is insufficiently welded even if sealed, the insufficiently welded portion is broken by the internal pressure so that it can be handled as the defective article. Thus, only the completely welded products are handled as conforming articles.

After the end of the test, the tested hollow body 1 is removed from the head cover 17 and the chuck 8. Simultaneously with this, the testing gas feeding solenoid valve 16 is closed, but the purge solenoid valve 30 is opened to increase the suction by the purge pump 29. As a result, the testing gas, as left at the previous testing time, is discharged out from the head cover 17 through the air passage in the gas detecting conduit 24 thereby to purge the air passage with the atmosphere. Of the hollow bodies 1, the indefective one is conveyed to a subsequent step of capping it or filling it with a content, whereas the defective one is discharged to the outside of the line by suitable means.

Here, the ambient gas blowing fan 23, as arranged in the vicinity of the head cover 17, is always acting to diffuse the ambient gas around the head cover 17 so that the concentration of the testing gas in the ambient gas is always held at a substantially constant level.

For a predetermined time period, as indicated by T3 (e.g., about 1.5 sec.) in FIGS. 4 and 5, the purging operation is continued and is ended at time t3, and a new zero point is set for testing the leakage of the subsequent hollow body 1 to be tested. Then, all the hollow bodies 1 are tested by repeating testing procedures similar to the aforementioned one.

In short, according to the leakage testing apparatus of this embodiment, it is possible to promptly detect the presence/absence of the leaking portion, as including the test on whether or not the weld 14, i.e., the welded portion between the head piece 2 and the body member 3 of the empty hollow body 1 before filled with the content is sufficiently welded, so that all the products can be tested.

In other words, the container, as formed by welding (or joining) two or more parts, generally has such a leaking passage due to the insufficient weld (or joint) as is meandering or shaped into a labyrinth, and is hence difficult to detect its leakage. According to the leakage testing apparatus of this embodiment, the leakage is detected by sucking and collecting the ambient gas around the hollow body 1 and by detecting the leakage by the concentration of the specific substance of the gas. As a result, the leakage can be reliably detected without depending upon the shape of the leaking portion. Since the leakage can be promptly detected, moreover, the testing operation can be speeded up to test all the articles manufactured.

Here, the leakage testing apparatus 5 is of the so-called "open type" to release the testing gas to the atmosphere, and the gas recovery means is desirably arranged by considering the working circumstance. When the testing gas is exemplified by the carbon dioxide gas, for example, the gas, as having leaked, is caused to reside in the lower portion by the action of gravity due to the difference in the specific gravity from the atmosphere. It is, therefore, preferable to arranged the gas recovery means in that lower portion so that it may act with the leakage testing apparatus 5 to recover the testing gas. It is further preferable to recover the gas to be discharged from the suction pump.

Figure 3:
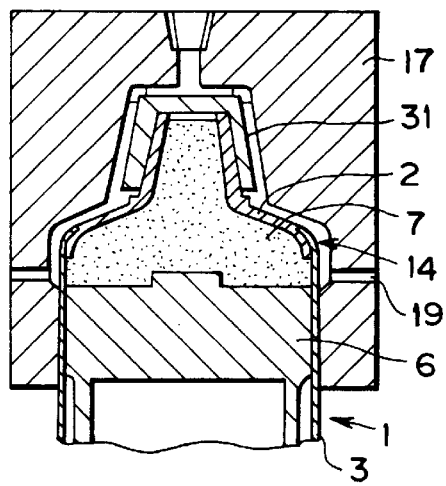
FIG. 3 is a schematic section showing the state in which the hollow body has a capped leading end portion.

Moreover, the leading end of the head piece 2 of the hollow body 1 to be tested in this embodiment is sealed exclusively with the metal foil 4. When this metal foil 4 may be broken by the internal pressure applied to the hollow body 1, this hollow body 1 can be tested with a lid 31 being fitted on the leading end of the head piece 2, as shown in FIG. 3.

Depending upon the position of placing the leakage testing apparatus 5, moreover, the concentration of the testing gas, as contained in the external ambient gas, may gradually rise as the leakage test of the hollow body 1 to be tested is repeated. Since the zero point is setting for each hollow body 1 to be tested, the testing gas concentration in the ambient gas far exceeds the reference value, if the leakage occurs, so that the leakage can be tested without fail.

In the embodiment thus far described, the means for measuring the concentration of the testing gas contained in the sucked gas is exemplified by the nondispersive infrared detector 25. In the present invention, however, the testing gas detecting apparatus can be exemplified by the gas chromatography or the Orsat analyzing apparatus, for example, and the component analyzing method can be exemplified by the apparatus employing the thermal conductivity method, the combustion heat method, the optical wave interference method, the electric conductivity method, the sealed specific gravity method, the gas balance method, the gas column method, the windmill method, the outflow method, the mass spectrometry, the sound wave method, or the magnetic method. Here, the detector should be adopted, when selected, as the most suitable one for the detection by considering the characteristics of the testing gas employed.

In the leakage testing apparatus 5 of the embodiment, on the other hand, the gas suction pump is exemplified by the testing gas suction pump 28 and the purge pump 29, which may be replaced by one pump. Then, upstream of this single pump, there may be arranged a valve for adjusting the flow rate to perform the suctions for the gas at the testing time and for the purge.

Moreover, the embodiment has been described in case the hollow body 1 made mainly of polypropylene (PP) is to be subjected to the leakage test. However, the present invention should not be limited thereto but can be applied to an apparatus for testing the leakage of containers or hollow members of various shapes such as containers molded mainly of plastic materials such as polyethylene, polystyrene, polycarbonate, ABS resin, or polyester, pouches formed of a film, or metallic containers or cans.

On the other hand, the testing gas should not be limited to the carbon dioxide gas but can be exemplified by the gas in the atmosphere such as oxygen or nitrogen, or such a rare gas as is little present in the atmosphere, such as helium or methane.

On the other hand, the chuck 8 should not be limited to the pneumatic chuck which is expanded by the air pressure as in the embodiment, but may be any if it can be radially expanded to seal the inside of the hollow body 1. Thus, it is possible to adopt an electromagnetic chuck, a single-action chuck, a scroll chuck, or a magnet chuck, for example.

Moreover, the specific embodiment is constructed such that the movement of the leading end of the hollow body 1, as accompanying the rise in the internal pressure, is checked by the abutment of the shoulder portion against the ribs 20, and such that the ribs 20 are prevented from pushing the weld 14. In the present invention, however, the construction may be made such that the weld is not pushed at the leakage testing time, or such that the movement of the hollow body 1 is checked by abutting against the leading end portion of the head piece 2.

The hollow body 1 for the laminated tube is prepared by welding the head piece 2 to one end portion of the cylindrical body member 3. This body member 3 is constructed, as shown in FIG. 6, by winding a laminated material cylindrically and by jointing (or welding) the two overlapped end portions of the laminated material by joint means (or weld means). If this joint (or weld) 40 of the body member 3 is defective, the content may possibly leak from the defective joint 40, and it is desired to test the leakage of the joint 40. A specific embodiment of the present invention to be described herein is constructed such that the leakage at this joint 40 is tested simultaneously with the aforementioned weld 14.

Figure 8:
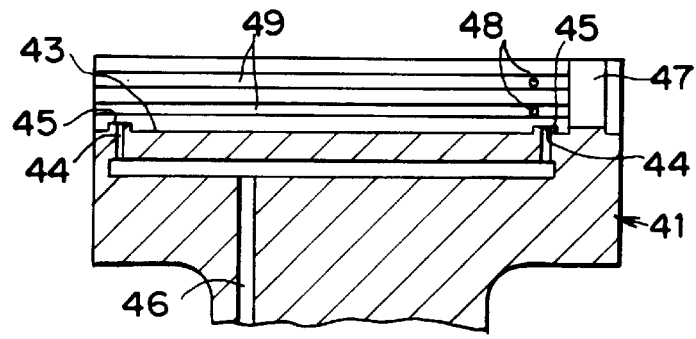
FIG. 8 is a section showing an under case of the apparatus.
Figure 9:
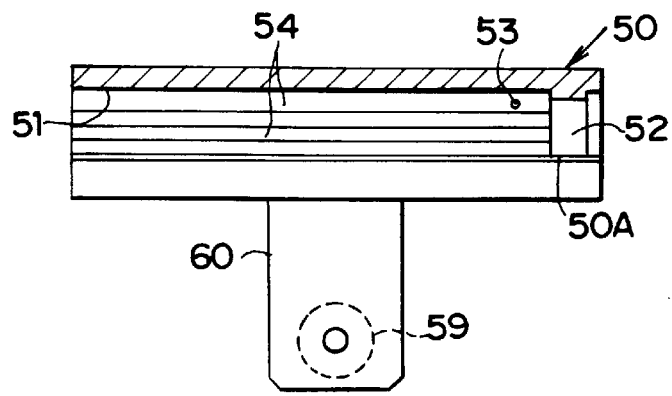
FIG. 9 is a section showing a main portion of an upper case of the apparatus.

FIG. 7 shows this entire construction schematically. On a bed 42, there is fixed an under case 41 for holding the hollow body 1 for the laminated tube to be subjected to the leakage test, generally in a horizontal position. This under case 41 is recessed on its upper face into a semicircle which has a slightly larger radius than the radius of curvature of the flexible hollow body 1 when this hollow body 1 is expanded into a cylindrical shape. On the bottom portions at the front and rear longitudinal end portions of an arcuate recess 43 (as shown in FIGS. 8 and 9), there are formed ridges 45 in which are individually opened suction ports 44. These suction ports 44 are selectively given the communication with a not-shown but predetermined suction source through a discharge hole 46 which is formed through the inside of the under case 41. In short, the hollow body 1 is placed and held on the ridges 45 by vacuum.

At one longitudinal end portion side (as located at the right end side in FIG. 8) of the arcuate recess 43, moreover, there is formed a band-shaped ridge or a pillow block 47 extending in the circumferential direction. In the portion closer to the leading end side (as located at the left side in FIG. 8) than the pillow block 47, there are formed a plurality of air inlet holes 48 which extend through the under case 41 radially from the inner face of the arcuate recess 43. In the inner face of the arcuate recess 43, moreover, there are formed a number of grooves 49 which are axially extended to retain a gas passage between the inner face and the hollow body 1 to be placed thereon at the testing time.

Figure 10:
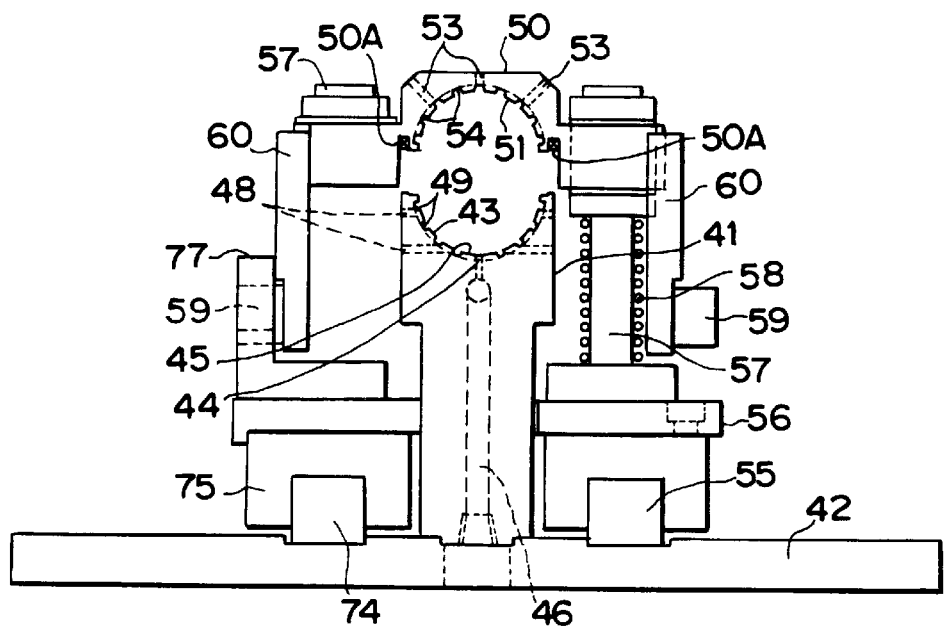
FIG. 10 is a side elevation showing the state, in which the upper case is moved to above the under case, with a head piece portion being omitted from the right side of the central portion of the under case.

An upper case 50 forming a pair with that under case 41 is mounted to reciprocate between the position covering the under case 41 and the position away from the under case 41. In the lower face of the upper case 50, as shown in FIG. 9 or 10, there is formed an arcuate recess 51 which is generally identical to the aforementioned arcuate recess 43. At one longitudinal end portion of the cylindrical recess 51, there is formed a pillow block 52 which has the same shape as that of the aforementioned pillow block 47. In the portion closer to the leading end side (as located at the left side in FIG. 9) than the pillow block 52, there are formed a plurality of air inlet holes 53 which extend radially from the inner face of the arcuate recess 51. In the inner face of the arcuate recess 51, there are further formed a number of grooves 54.

Over the bed 42 and at the left and right sides across the under case 41, there are arranged a pair of moving blocks 56 which individually engage with a rail 55 so that they can move back and forth. At the front and rear positions of each moving block 56, there are erected guide posts 57 so that the aforementioned upper case 50 is so mounted on those four guide posts 57 as to move up and down. On these guide posts 57, moreover, there are fitted coil springs 58 acting as a lifting mechanism so that the upper case 50 is usually held in a lifted position higher than the upper face of the aforementioned under case 41 by the coil springs 58.

At the left and right sides and at the longitudinal center portions of the upper case 50, moreover, there are arranged rollers 59 which are suspended by mounting plates 60 so that they may function as cam followers for lowering the upper case 50. Here, the rollers 59 are so mounted on the mounting plates 60 as to rotate on the axis, as directed transversely of FIG. 10. Moreover, the aforementioned under case 41 and upper case 50 are formed to have a length substantially equal to or slightly larger than that of the body member 3 of the hollow body 1 to be tested. Moreover, a seal member 50A is fitted on the upper face 51 so as to keep the gas tightness on the individual mating faces.

At the rear side of the extension of the under case 41, as located at the right hand of FIG. 7, there is so arranged a mandrel 61 forming part of the injection mechanism of the present invention as to move back and forth toward the under case 41. This mandrel 61 is to be inserted into the hollow body 1 which is held by the individual cases 41 and 50. For this insertion, the mandrel 61 is formed into a shape, which is similar to the internal shape of the hollow body 1, and the length and external diameter of which are slightly smaller than those of the internal shape of the hollow body 1.

At the rear end portion of the mandrel 61, on the other hand, there is mounted a chuck 62 which is made elastically expansible/contractible. This chuck 62 is made of an annular elastic material such as rubber having a slightly smaller external diameter than the internal diameter of the body member 3, for example, and is constructed such that it is radially expanded, when axially compressed, to come into close contact with the inner circumference of the body member 3.

These mandrel 61 and chuck 62 are carried in a cantilever state, in which they protrude toward the under case 41, by a carriage 64 which can move back and forth along a rail 63 placed on the bed 42. At the portion of this carriage 64, as located at the side opposed to the mandrel 61, there is mounted an actuator 65 such as an air cylinder for pushing the chuck 62 axially.

Figure 11:
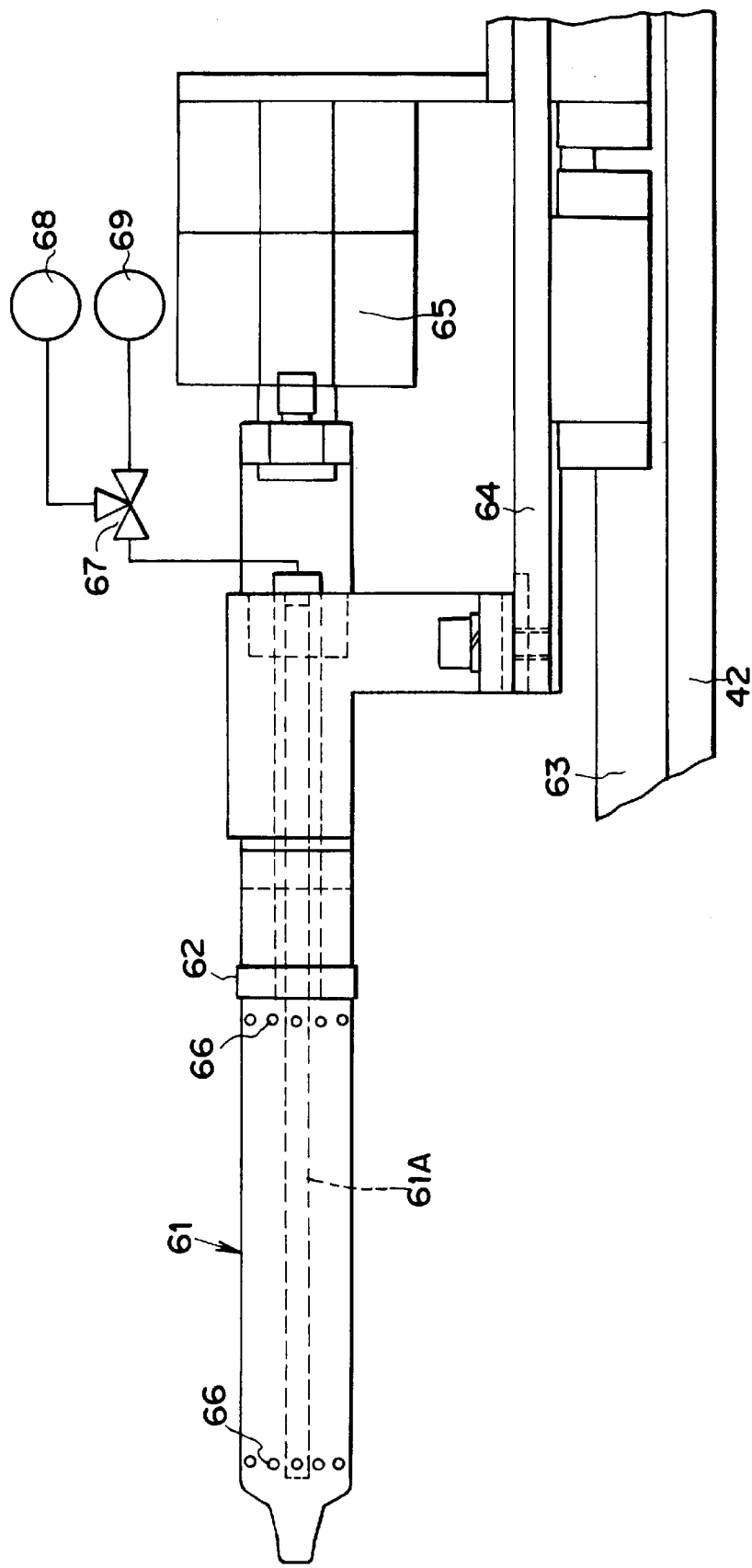
FIG. 11 is a schematic diagram showing a mandrel or an inserting mechanism and its air feed/discharge system.

A gas passage 61A is formed to extend axially through the insides of the mandrel 61 and the chuck 62, and a plurality of gas vents 66 are so formed all over the circumference in the leading end portion and the trailing end portion of the mandrel 61 as to communicate with that gas passage 61A. Moreover, this gas passage 61A is connected (as shown in FIG. 11) through a change-over valve 67 with a testing gas source 68 such as a gas cylinder and a vacuum source 69.

Figure 12:
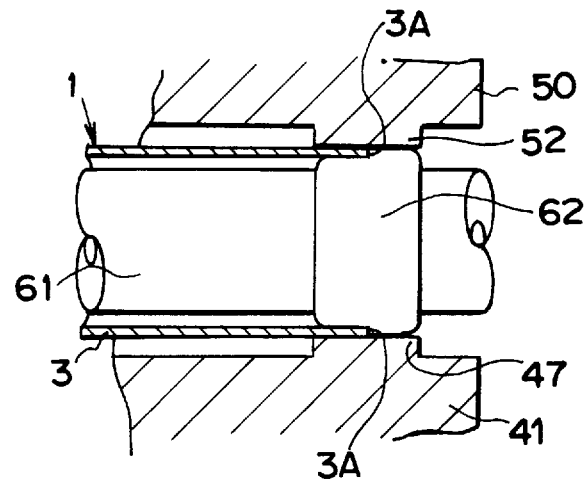
FIG. 12 is a section of a portion showing the state in which the open end portion of the hollow body is sealed with a chuck.

Here will be described the relative positions between the hollow body 1 and the chuck 62, as held by the aforementioned individual cases 41 and 50. The open end at the rear end side of the hollow body 1 over the under case 41 is positioned in the inner circumferences of the pillow blocks 47 and 52, and chuck 62 is positioned in the inner circumferences of the pillow blocks 47 and 52 with the mandrel 61 being inserted in the hollow body 1. This state is schematically shown in FIG. 12, in which the chuck 62 is inserted from the outside into the inside of the hollow body 1 across the open end of the hollow body 1. In other words, the open end of the hollow body 1 has its edge 3A positioned in the intermediate portion, as taken in the axial direction, of the chuck 62. This is because the gas tightness is ensured, when the chuck 62 is radially expanded, not only by bringing the chuck 62 into close contact with the inner face of the hollow body 1 but also by causing the edge 3A of the open end of the hollow body 1 to bite into the chuck 62.

At the opposite side to the mandrel 61 across the under case 41, there is arranged a head cover 70 such that it can move back and forth toward the under case 41. In this head cover 70, like the aforementioned head cover 17 shown in FIG. 2, there is formed therein a hollow portion 71 for receiving the leading end portion of the hollow body 1. For this reception, the hollow portion 71 is formed into a slightly larger similar shape than the external shape of the leading end portion of the hollow body 1. In the hollow portion 71, moreover, there are formed a plurality of suction holes 72 which are opened in the portion corresponding to the shoulder portion of the hollow body 1. Another suction hole 172 is further formed in the top face of the head cover 70. These suction holes 72 and 172 are connected from one port 73 to a detection mechanism such as the nondispersive infrared detector, as shown in FIG. 1, for detecting the testing gas.

The head cover 70 is carried on a carriage 75 which can move back and forth while engaging with a rail 74 which is arranged at the opposite side of the rail 63 for the mandrel 61 across the under case 41. On the end face of the head cover 70, as located at the side of the under case 41, there is mounted a seal member 76 such as a seal ring for holding the gas tightness between the head cover 70 and the individual cases 41 and 50.

Moreover, the carriage 75 carrying the head cover 70 is equipped with means for moving up/down the upper case 50. To the left and right sides of the carriage 75, as confronting the rollers 59, there are attached arms 77 which are projected toward the under case 41. The lower face of the leading end of each arm 77 is sloped upward to the leading end to provide a cam 78. As the carriage 75 moves forward, the rollers 59 are guided downward by the cams 78 so that the upper case 50 goes down relative to the under case 41.

As a result, the hollow body 1 to be tested is confined in the cylindrical portion defined by the cases 41 and 50 and is held gas-tight between the cases 41 and 50 by the chuck 62 inserted into the rear end portion of the cylindrical portion, and its leading end portion is inserted into the head cover 70. Thus, the cases 41, 50, the chuck 62 and the head cover 70 correspond to the hold mechanism of the present invention. On the other hand, the mandrel 61, the change-over valve 67 and the testing gas source 68 correspond to the injection mechanism of the present invention. In addition, the mechanism including the infrared detector of FIG. 1, as connected with the port 73, corresponds to the leakage detecting means. Moreover, the vacuum source 69 and the purge pump correspond to the purge means of the present invention.

Here, the means for moving the upper case 50, the mandrel 61, and the head cover 70 back and forth toward the under case 41 may be exemplified by a suitable one, if necessary. When the under case 41 is completely fixed, for example, the means can be constructed to move the upper case 50, the mandrel 61, or the head cover 70 back and forth by the actuator such as an air cylinder. When the hollow body 1 is to be subjected to the leakage test while being moved by either moving the bed 42 horizontally or turning it on a horizontal axis, the upper case 50, the mandrel 61, or the head cover 70 may be moved back and forth by a cam mechanism which is constructed by forming a cam groove in the moving or turning direction and by connecting a cam follower engaging with the cam groove to the upper case 50, the mandrel 61, or the head cover 70. Moreover, the means for moving up/down the upper case 50, i.e., for opening/closing the cases 41 and 50 should not be limited to the cams 78 and the rollers 59 but may be constructed such that the cases 41 and 50 are directly opened/closed by the actuator such as an air cylinder.

Here will be described the method of testing the leakage of the hollow body 1 by the apparatus thus far described. The hollow body 1, as conveyed from the manufacture process, is placed on the arcuate recess 43 of the under case 41 by a turret transfer machine or a robot (although not shown). The communication of the discharge hole 46 with the not-shown suction source is then opened so that the hollow body 1 is attracted on the individual suction ports 44 by the vacuum. Then, the open end of the rear end side of the hollow body 1 is placed on the pillow block 47.

In this state, the upper case 50 is moved toward the under case 41 and is positioned thereover. The carriage 64 carrying the mandrel 61 is moved toward the under case 41 so that the mandrel 61 and the chuck 62 are inserted into the hollow body 1 on the under case 41. At this instant, the chuck 62 is not radially expanded yet so that it has no interference with the hollow body 1. Moreover, the chuck 62 is positioned to extend inward and outward across the open end of the hollow body 1.

Then, the head cover 70 is carried toward the under case 41 by its carriage 75. In this case, the cams 78 are brought at first into engagement with the rollers 59 of the upper case 50 so that the upper case 50 is moved down through the rollers 59 as the head cover 70 advances. When the cases 41 and 50 abut against each other, the hollow body 1 is accommodated/held in the cylindrical portion which is defined by the cylindrical recesses 43 and 51 of the cases 41 and 50. When the head cover 70 advances to the forward end, it comes into abutment against the end faces of the under case 41 and the upper case 50 integrated, to accommodate the leading end portion of the hollow body 1 in its internal hollow portion 71 and to close the hollow portion 71 gas-tight.

Simultaneously with this, the chuck 62 is pushed in the axial direction by the actuator 65 so that the chuck 62 is radially expanded. As a result, the open end of the hollow body 1 is clamped between the chuck 62 and the upper and lower pillow blocks 47 and 52 so that it is closed gas-tightly. In this case, the chuck 62 is slightly projected from the open end of the hollow body 1 to have close contact with the inner circumference and the edge 3A of the open end of the hollow body 1 such that the edge 3A bites into the chuck 62 thereby to improve the gas-tightness.

With the hollow body 1 being thus held, the suction is performed through the suction holes 72 and the suction hole 172 of the head cover 70 so that the gas (or air) around the hollow body 1 is carried to the detection mechanism, in which the concentration of the testing gas in the so-called "ambient gas" is measured to set the zero point with reference to the measured value. When the testing gas (e.g., the $CO_2$ gas) is fed from the testing gas source 68 through the change-over valve 67 to the mandrel 61, it is fed under pressure from the gas vents 66 to the inside of the hollow body 1. Here is released the vacuum for fixing the hollow body 1 in the under case 41.

When the hollow body 1 has no defect to cause no leakage of the testing gas, the gas to be fed to the detection mechanism by the suction from those suction holes 72 is only the atmosphere which has flown in from the air inlet holes 48 and 53 formed in the cases 41 and 50, respectively. As a result, the concentration of the testing gas, as achieved by the detection means such as the infrared detector, has no meaningful change, and it is detected on the basis of the detected value that there is no leakage, namely, that the hollow body 1 is indefective.

When the joint 40 or the weld 14 of the hollow body 1 is so defective as to cause the leakage of the testing gas, on the other hand, this testing gas is mixed into the gas flowing around the hollow body 1. As a result, the concentration of the testing gas, as achieved by the detection means such as the infrared detector, rises over the reference value set to the zero point, so that the leakage of the testing gas is detected. In short, it is detected on the basis of the detected value that the hollow body 1 is defective.

Here, the air inlet holes 48 and 53 for guiding the atmosphere to the outer circumference of the hollow body 1 are formed near the pillow blocks 47 and 52 whereas the suction holes 72 and the suction hole 172 are formed in the head cover 70, and those air inlet holes 48 and 53 and the suction holes 72 and 172 are formed at the opposite sides in the longitudinal direction of the hollow body 1 so that the gas flows all over the outer circumference of the hollow body 1 without any residence. As a result, the testing gas never fails to be captured, if any leaking portion is present, so that an accurate test can be performed.

The time period for feeding the testing gas is about 0.8 sec., for example, and the time period for detecting the testing gas is slightly longer and about 1.0 sec. so that the measurement of the concentration of the testing gas is ended after lapse of about 1.0 sec. from the start of the feed of the testing gas. Then, the head cover 70 is retracted away from the under case 41. Out of engagement with the cams 78 or arms 77 and the rollers 59, therefore, the upper case 50 is lifted by the coil springs 58. Simultaneously with this, the actuator 65 having pushed the chuck 62 is released from its pushing action. As a result, the chuck 62 is radially contracted by its own elastic force to release the sealing of the inner and outer faces of the hollow body 1.

When the hollow body 1 is thus released from its held state, it is attracted and held again in the under case 41 by the suction from the suction ports 44. Then, the head cover 70 and the mandrel 61 restore their initial positions. In this case, the mandrel 61 is extracted from the hollow body 1 so that the testing gas residing in the hollow body 1 is discharged from the inside of the hollow body 1. In accordance with this, the concentration of the testing gas around the testing apparatus gradually rises. In order to avoid this rise, e testing gas may be diffused by the fan, as described in the foregoing embodiment. For this diffusion, a fan may be placed in the vicinity of the head cover 70 to blow the wind toward (i.e., rightward of FIG. 7) the body portion of the hollow body 1.

Alternatively, the inside of the hollow body 1 can be positively purged of the testing gas. For example, the mandrel 61 is given the communication with the vacuum source 69 by the change-over valve 67 so that the testing gas is sucked from the inside of the hollow body 1 through the mandrel 61, and this mandrel 61 is extracted from the hollow body 1. Thus, it is possible to prevent the situation in which the testing gas fed to the inside of the hollow body 1 leaks and resides therearound to affect the testing accuracy adversely.

Finally, the vacuum of the hollow body 1 through the suction ports 44 in the under case 41 is released, and the hollow body 1 is removed from the under case 41. The handling for the cases in which the hollow body 1 is indefective and defective to have a leakage is performed as in the foregoing embodiment.

Here, the open end of the hollow body 1 to be clamped between the chuck 62 and the pillow blocks 47 and 52 is the portion to be weld-jointed when the hollow body 1 is to be constructed into a tube container. Therefore, the joint 40 near the open end is not subjected to any leakage test without any serious problem. In this embodiment, therefore, the hollow body 1 to be tested is enclosed in its entirety by the hold mechanism to establish the flow of the atmosphere around its entirety. As a result, it is possible to ensure the leakage test of the entire joint and to test the defect such as pin holes other than the joint.

In the foregoing embodiment, on the other hand, the means for injecting the pressurized testing gas into the hollow body 1 is exemplified by the mandrel 61 to be fitted at a small clearance on the inner face of the hollow body 1. It is, therefore, possible to prevent the expansion more than necessary of the hollow body 1 in advance even when the testing gas has a high injection pressure.

Figure 13:
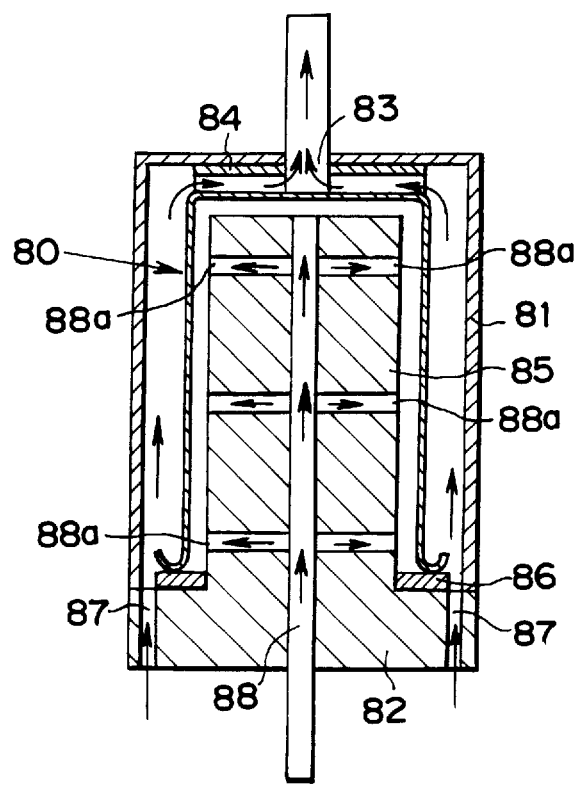
FIG. 13 is a schematic diagram showing still another embodiment of the present invention, as constructed as a can body leakage testing apparatus.
Figure 14:
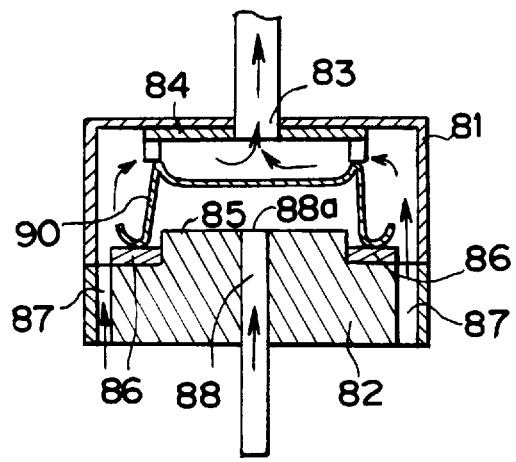
FIG. 14 is a schematic diagram showing a further embodiment of the present invention, as constructed as a can lid leakage testing apparatus.

As described hereinbefore, the present invention can be applied to the leakage testing apparatus not only for the hollow bodies for tubes but also for a variety of hollow members. The invention can be constructed as a leakage testing apparatus for can bodies, as shown in FIG. 13, or as a leakage testing apparatus for can lids, as shown in FIG. 14. Here will be briefly described those constructions. In FIG. 13, a hold mechanism is constructed of a case 81 for accommodating a can body 80 and an end plate 82 to be attached to the open end of the can body 80. The case 81 is a container having one closed end as in the can body 80 to be tested, and is given larger external diameter and length than those of the can body 80. In the center of the closed end portion of the case 81, moreover, there is formed a suction hole 83 which has communication with a leakage testing mechanism composed mainly of a nondispersive infrared detector (although both are not shown). On the end face in which is opened the suction hole 83, still moreover, there is arrangement an abutment plate 84 which abuts against the bottom portion of the can body 80 to position it and which has a groove for keeping a passage for the gas.

On the other hand, the end plate 82 is a disc- shaped member having a diameter substantially equal to that of the open end of the case 81. With the central portion of the end plate 82, there is integrally formed an injection nozzle head (or a mandrel) 85 which has a slightly smaller external diameter than the internal diameter of the can body 80 and which is to be inserted into the can body 80. Of the end face of the end plate 82, on the other hand, the outer circumference of the injection nozzle head 85 is equipped with a seal portion 86 for abutting against the open end of the can body 80 to establish a gas tight state. The seal portion 86 is made of a planar member of an elastic material such as rubber.

In the end plate 82, moreover, there are formed a plurality of inlet holes 87 which are extended through the thickness of the end plate 82 for introducing the atmosphere into the inside of the case 81. There is further formed a testing gas feed passage 88 which is extended through the center portion of the injection nozzle head 85. This gas feed passage 88 is branched at its longitudinal intermediate portion into a plurality of branches which are opened as a plurality of gas injection holes 88a in the outer circumference of the injection nozzle head 85. Thus, this injection nozzle head 85 (or the mandrel) corresponds to the injection mechanism of the present invention.

Therefore, the injection nozzle head 85 is inserted into the inside of the can body 80, and the seal portion 86 is brought into close contact with the open end of the can body 80. When the outer circumference of the can body 80 is enclosed in this state by the case 81, the can body 80 is clamped between the abutment plate 84 and the seal portion 86 so that its inside and outside are isolated gas-tight from each other. If the suction is made in this state through the suction hole 83 by the leakage testing mechanism, the atmosphere is sucked from the inlet holes 87 into the inside of the case 81 so that it flows around the can body 80. At this instant, the zero point is set by employing the concentration of the testing gas, as contained in the sucked gas, as the reference value. Next, the testing gas such as the $CO_2$ gas is pressurized and fed from the gas feed passage 88 into the inside of the can body 80.

If the can body 80 has a defect such as an insufficient weld or a pin hole, the testing gas in the can body 80 will leak to the outside so that it is mixed with the atmosphere flowing around the can body 80 and carried to the leakage testing mechanism. As a result, the concentration of the testing gas to be detected rises, and it is decided that the can body 80 is defective. If the can body 80 has no defect, on the other hand, the detected value of the testing gas will not rise, and it is decided that the can body 80 is indefective.

FIG. 14 schematically shows a leakage testing apparatus for a can lid 90. This can lid 90 also has a hollow shape having one closed end as in the can body 80 so that its testing apparatus has a basic construction similar to that of the apparatus shown in FIG. 13, with a slight difference in the size. For the apparatus shown in FIG. 14, the portions similar to those of the apparatus of FIG. 13 are designated by the common reference numerals, and their description will be omitted. Only one injection hole 88a is provided in the present embodiment, but a plurality of injection holes may be formed.

Figure 15A:
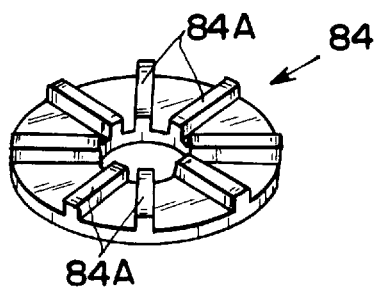
FIG. 15A is a perspective view showing an abutment plate to abut against a can body or a can lid.
Figure 15B:
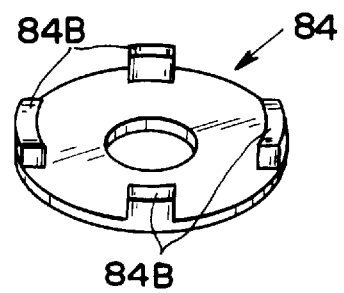
FIG. 15B is a perspective view showing another abutment plate to abut against the can body or the can lid.

The abutment plate 84 to be used in the apparatus shown in FIG. 13 or 14 may be any if it can position the can body 80 or the can lid 90 while retaining a gap for the gas flow between the end face of the case 81 and the end face of the can body 80 or the can lid 90 to be tested, as shown in FIG. 15A or 15B. In the example shown in FIG. 15A, the abutment plate 84 is exemplified by an annular disc having a number of radial ridges 84A. In the example of FIG. 15B, on the other hand, the abutment plate 84 is exemplified by an annular disc having a number of pawls 84B on its circumferential edge. The abutment plate 85 of either shape can hold the can body 80 or the can lid 90 while retaining the passage for the gas.

Here will be synthetically described the advantages to be achieved by the present invention. According to the apparatus of the present invention, the leakage of the gas can be detected, even in a small quantity, as the concentration change of a specific substance in the ambient gas, and is sucked as the ambient gas, as different from the operation to capture only the testing gas, and subjected to a qualitative analysis so that it can be detected in a high accuracy and at a high speed. Moreover, the apparatus can be constructed as the so-called "open-type apparatus" so that it can be easily manufactured.

According to the method of the present invention, the concentration of the testing gas in the ambient gas with no feed of the testing gas and the concentration of the testing gas, as contained in the ambient gas while the testing gas is being fed to the inside of the hollow body to be tested, can be compared to decide that the hollow body has a leakage and to detect it as a defective when the concentration of the testing gas being fed is high. Thus, the so-called "open type leakage test" can be performed easily and accurately with reference to the ambient gas without providing any special testing chamber.

What is claimed is:

1. A leakage testing apparatus for testing whether or not a hollow member of a hollow shape has a leakage, comprising:

a hold mechanism for holding said hollow member is configured such that an inside volume and an outside of said hollow member are isolated gas-tight from each other and so that the outside of said hollow member is exposed at all times, to an atmosphere external to the testing apparatus which includes an atmospheric gas;

an injection mechanism for injecting a testing gas into the inside volume of said hollow member held by said hold mechanism; and a leakage detector configured to suck the atmospheric gas at all times and any of the testing gas, with the atmospheric gas, leaked from the inside volume of the hollow member from around the outside of said hollow member, to detect the leakage on the basis of the concentration of the testing gas in the sucked gas.

2. A leakage testing apparatus according to claim 1, wherein said hold mechanism includes a case for enclosing the outer circumference of said hollow member and a seal member for sealing the opening of said hollow member gas-tight, and wherein said injection mechanism includes injection holes for injecting the testing gas into the inside of said hollow member through said seal member.

3. A leakage testing apparatus according to claim 2, wherein said case includes suction holes formed in positions in one longitudinal end portion of said hollow member and communicating with said leakage detecting means; and air inlet holes formed in positions in the longitudinally opposite side of said hollow member to said suction holes.

4. A leakage testing apparatus according to claim 2, wherein said seal member includes an expansible member inserted into the inside of said hollow member and made elastically expansible to contact with the inner face and the edge of the open end of said hollow member.

5. A leakage testing apparatus according to claim 1, wherein said hollow member includes a joint, wherein said hold mechanism includes means for holding said hollow member while covering the outer circumference of said joint, and wherein said injection mechanism includes means for injecting the testing gas into the inner circumference side of said joint.

6. A leakage testing apparatus according to claim 5, wherein said hold mechanism includes a suction hole formed in position in one longitudinal end portion of said hollow member and communicating with said leakage detector means, and a plurality of inlet holes formed in positions in the longitudinally opposite side of said hollow member to said suction hole.

7. A leakage testing apparatus according to claim 1, wherein said hollow member includes a cylindrical body portion and a head piece jointed to one end portion of said body portion, wherein said hold mechanism includes a head cover covering the outer circumference between said body portion and said head piece and the outer circumference of said head piece, and a seal member for closely contacting with the inner circumference of said body portion to seal the joint of said hollow member and the portion of said hollow member at the side of said head piece gas-tight, and wherein said injection mechanism includes an injection hole extending through said seal member for injecting the testing gas into the inside of said hollow member.

8. A leakage testing apparatus according to claim 7, further comprising:

a suction hole formed in said head cover for providing the communication between the inside of said head cover and said leakage detector; and a plurality of inlet holes formed in said head cover for introducing the atmosphere into the inside of said head cover.

9. A leakage testing apparatus according to claim 1, wherein said injection mechanism includes a mandrel inserted into the inside of said hollow member while leaving a slight gap from the inner face of said hollow member, and one, two or more injection holes formed to extend through said mandrel for blowing the testing gas out of said mandrel.

10. A leakage testing apparatus according to claim 9, further comprising: purge means for selectively communicating with said injection holes to purge the inside of said hollow member.

11. A leakage testing apparatus according to claim 1, wherein said leakage detector includes means for detecting the leakage on the basis of the result of the comparison which is made between the concentration of the testing gas in the gas sucked at the instant when the testing gas is not injected and the concentration of the testing gas in the gas sucked at the instant when the testing gas is injected by said injection mechanism.

12. A leakage testing apparatus according to claim 1, further comprising:

purge means for selectively increasing the flow of the gas to be sucked by said leakage detection means.

13. A method of detecting whether or not a hollow member to be tested has a gas leakage, comprising:

setting the measured value of the concentration of a testing gas, as contained in an ambient gas around an outside of said hollow member, as a reference value;

injecting the testing gas into the inside of said hollow member after the step of setting the measured value;

sucking and collecting the ambient gas around said hollow member;

measuring the concentration of the testing gas in the sucked and collected ambient gas; and comparing the measured value and said reference value to decide whether or not there is leakage from said hollow member.

* * * * *

UNITED STATES PATENT AND TRADEMARK OFFICE
CERTIFICATE OF CORRECTION

PATENT NO. : 5861547
DATED : January 19, 1999
INVENTOR(S) : Shigeya KAWAI, et al.

It is certified that error appears in the above-identified patent and that said Letters Patent is hereby corrected as shown below:

Claim 12, line 4, "detection means" should be --detector--.

Signed and Sealed this

Eighteenth Day of May, 1999

Attest:

Attesting Officer

Q. TODD DICKINSON

Acting Commissioner of Patents and Trademarks